(12) United States Patent
Ackaret et al.

(10) Patent No.: US 9,389,937 B2
(45) Date of Patent: Jul. 12, 2016

(54) MANAGING FAULTY MEMORY PAGES IN A COMPUTING SYSTEM

(71) Applicant: LENOVO ENTERPRISE SOLUTIONS (SINGAPORE) PTE. LTD., Singapore (SG)

(72) Inventors: Jerry D. Ackaret, Beaverton, OR (US); Sumeet Kochar, Apex, NC (US); Randolph S. Kolvick, Durham, NC (US); Wilson E. Smith, Bahama, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 14/083,504

(22) Filed: Nov. 19, 2013

(65) Prior Publication Data

US 2015/0143052 A1    May 21, 2015

(51) Int. Cl.
*G06F 13/00* (2006.01)
*G06F 11/07* (2006.01)

(52) U.S. Cl.
CPC .......... *G06F 11/073* (2013.01); *G06F 11/0754* (2013.01)

(58) Field of Classification Search
CPC ......... G06F 11/10; G06F 12/00; G06F 12/02; G06F 11/20
See application file for complete search history.

(56) References Cited

U.S. PATENT DOCUMENTS

| | | | | |
|---|---|---|---|---|
| 5,271,011 A | * | 12/1993 | McMullan et al. | 714/807 |
| 6,073,251 A | | 6/2000 | Jewett et al. | |
| 6,662,322 B1 | * | 12/2003 | Abdelilah et al. | 714/708 |
| 7,610,523 B1 | * | 10/2009 | Singh | 714/718 |
| 2004/0030957 A1 | * | 2/2004 | Yadavalli et al. | 714/30 |
| 2005/0028039 A1 | * | 2/2005 | Henderson et al. | 714/42 |
| 2007/0180328 A1 | * | 8/2007 | Cornwell et al. | 714/42 |
| 2011/0099458 A1 | * | 4/2011 | Reche et al. | 714/763 |
| 2012/0144272 A1 | * | 6/2012 | Franceschini et al. | 714/773 |
| 2013/0073898 A1 | | 3/2013 | Reche et al. | |

FOREIGN PATENT DOCUMENTS

EP    2 372 549 A1    10/2011

OTHER PUBLICATIONS

Xingjun Zhang, "Software-based Detecting and Recovering from ECC-Memory Faults", Nov. 30 2011, IEEE, 978-1-4577-1908-0.*

* cited by examiner

*Primary Examiner* — Charles Rones
*Assistant Examiner* — Han Doan
(74) *Attorney, Agent, or Firm* — Edward J. Lenart; Katherine S. Brown; Kennedy Lenart Spraggins LLP

(57) ABSTRACT

Managing faulty memory pages in a computing system, including: tracking, by a page management module, a number of errors associated with a memory page; determining, by the page management module, whether the number of errors associated with the memory page exceeds a predetermined threshold; responsive to determining that the number of errors associated with the memory page exceeds the predetermined threshold, attempting, by the page management module, to retire the memory page; determining, by the page management module, whether the memory page has been successfully retired; and responsive to determining that the memory page has not been successfully retired, generating, by the page management module, a predictive failure alert.

15 Claims, 4 Drawing Sheets

MANAGING FAULTY MEMORY PAGES IN A COMPUTING SYSTEM

BACKGROUND OF THE INVENTION

1. Field of the Invention

The field of the invention is data processing, or, more specifically, methods, apparatuses, and products for managing faulty memory pages in a computing system.

2. Description of Related Art

Modern computing systems can include memory modules that support a virtualized memory system that includes pages of virtual memory. Such memory modules may include component parts that wear out over time, are faulty as originally manufactured, and so on. As such, some portions of virtual memory may be mapped to physical memory that does not operate as expected while other portions of the physical memory may still be usable.

SUMMARY OF THE INVENTION

Methods, apparatuses, and products for managing faulty memory pages in a computing system, including: tracking, by a page management module, a number of errors associated with a memory page; determining, by the page management module, whether the number of errors associated with the memory page exceeds a predetermined threshold; responsive to determining that the number of errors associated with the memory page exceeds the predetermined threshold, attempting, by the page management module, to retire the memory page; determining, by the page management module, whether the memory page has been successfully retired; and responsive to determining that the memory page has not been successfully retired, generating, by the page management module, a predictive failure alert.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
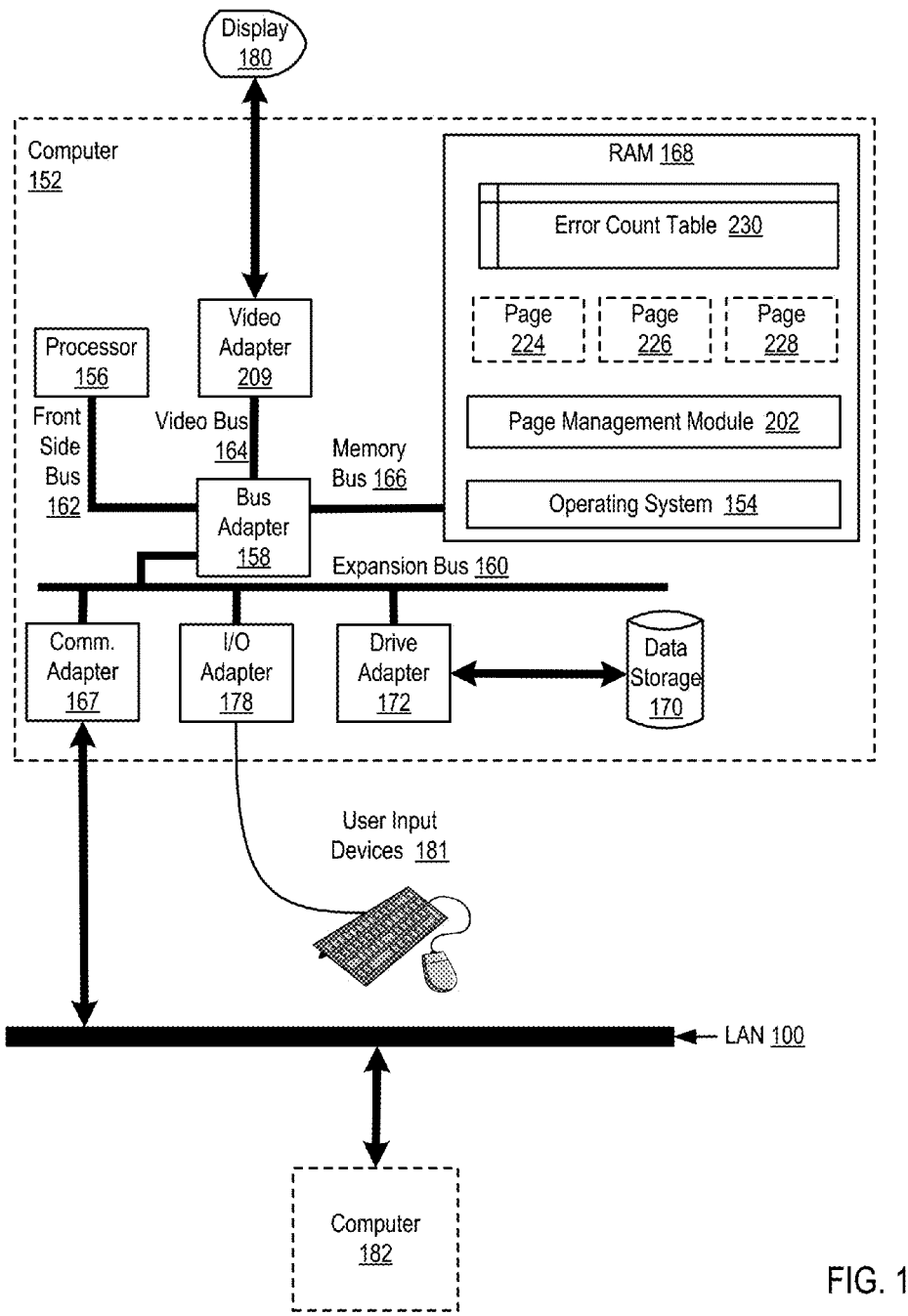
FIG. 1 sets forth a block diagram of automated computing machinery comprising an example computer useful in managing faulty memory pages in a computing system according to embodiments of the present invention.

Example methods, apparatuses, and products for managing faulty memory pages in a computing system in accordance with the present invention are described with reference to the accompanying drawings, beginning with FIG. 1. FIG. 1 sets forth a block diagram of automated computing machinery comprising an example computer (152) useful in managing faulty memory pages in a computing system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). In the example of FIG. 1, RAM (168) may be embodied as a dual in-line memory module ('DIMM') that includes a series of dynamic random-access memory integrated circuits. RAM (168) may be segmented into a plurality of pages (224, 226, 228). Each page (224, 226, 228) represents a fixed-length contiguous block of virtual memory that is supported by the underlying physical memory.

Stored in RAM (168) is a page management module (202), a module of computer program instructions for managing faulty memory pages in a computing system. The page management module (202) of FIG. 1 may be configured to manage faulty memory pages in a computing system by tracking a number of errors associated with a memory page (224, 226, 228). Tracking the number of errors associated with a memory page (224, 226, 228) may be carried out through the use of an error count table (230) or other data structure. In such an example, the error count table (230) may include entries for one more of the memory pages (224, 226, 228). Each entry in the error count table (230) may also include a counter identifying the number of errors associated with one or more of the memory pages (224, 226, 228). As such, each time an error is received that is associated with a particular memory page (224), the counter associated with the particular memory page (224) may be incremented.

The errors associated with a memory page (224, 226, 228) are generally correctable errors that may be indicative of a problem with a particular memory page (224, 226, 228). In such an example, the number of errors associated with a memory page (224, 226, 228) that are tracked by the page management module (202) may be characterized as long term errors and short term errors. Short term errors may represent errors that have occurred within a predetermined recent period of time (e.g., 10 seconds, 1 minute, 1 day, etc. . . . ) while long term errors may represent errors that have occurred outside of the predetermined recent period of time. Alternatively, short term errors may represent errors that have occurred within a predetermined recent period of time (e.g., 1 minute) while long term errors may represent errors that have occurred during a longer predetermined recent period of time (e.g., 1 day), such that all short term errors are also long term errors. As such, the page management module (202) may track both the number of short term errors associated with a memory page (224, 226, 228) and the number of long term errors associated with a memory page (224, 226, 228). In such a way, the page management module (202) may distinguish between errors that have occurred in a recent error burst versus historical patterns of error activity.

The page management module (202) of FIG. 1 may be further configured to manage faulty memory pages in a computing system by determining whether the number of errors associated with the memory page (224, 226, 228) exceeds a predetermined threshold. For ease of explanation, the remainder of FIG. 1 will be described using memory page (224) as the memory page generating errors. In the example of FIG. 1, the predetermined threshold can represent a limit as to the amount of errors associated with the memory page (224) that may occur without requiring intervention from the page management module (202), a system administrator, or other administrative entity. The predetermined threshold described above may include multiple thresholds such as a short term error threshold and a long term error threshold, each of which is set by a system administrator, manufacturer of the memory modules supporting the memory page (224), or other administrative entity.

The page management module (202) of FIG. 1 may be further configured to manage faulty memory pages in a computing system by attempting to retire the memory page (224). Retiring a memory page (224) is a technique that allows a memory page (224) suffering from correctable errors to be removed from use in the virtual memory system—without interrupting user applications. In such an example, however, retiring a memory page (224) requires an operating system or hypervisor that supports page retirement. In the example of FIG. 1, attempting to retire the memory page is carried out in response to affirmatively determining that the number of errors associated with the memory page (224) exceeds the predetermined threshold.

The page management module (202) of FIG. 1 may be configured to manage faulty memory pages in a computing system by determining whether the memory page (224) has been successfully retired. Determining whether the memory page (224) has been successfully retired may be carried out, for example, by setting a timer representing a sufficient amount of time for retiring a memory page (224). After the timer has expired, the page management module (202) may subsequently monitor error codes generated by the memory system to determine whether errors continue to be generated for the memory page (224) that was retired. In such an example, when errors continue to be generated for the memory page (224) that was retired, the page management module (202) may assume that the memory page (224) was not successfully retired in view of the fact that a retired memory page (224) will not be accessed and therefore will not cause errors to be generated.

The page management module (202) of FIG. 1 may be configured to manage faulty memory pages in a computing system by generating a predictive failure alert. A predictive failure alert represents an alert sent to a system administrator or other administrative entity indicating that the memory page (224) that has generated a number of errors that exceeds a predetermined threshold is in need of servicing. Generating a predictive failure alert is carried out in response to determining that the memory page has not been successfully retired. In such an example, the memory page may not have been successfully retired because the operating system or hypervisor does not support page retirement.

Also stored in RAM (168) is an operating system (154). Operating systems useful managing faulty memory pages in a computing system according to embodiments of the present invention include UNIX™, Linux™, Microsoft XP™, AIX™, IBM's i5/OS™, and others as will occur to those of skill in the art. The operating system (154) and the page management module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for managing faulty memory pages in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing faulty memory pages in a computing system according to embodiments of the present invention include modems for wired dial-up communications, Ethernet (IEEE 802.3) adapters for wired data communications network communications, and 802.11 adapters for wireless data communications network communications.

Figure 2:
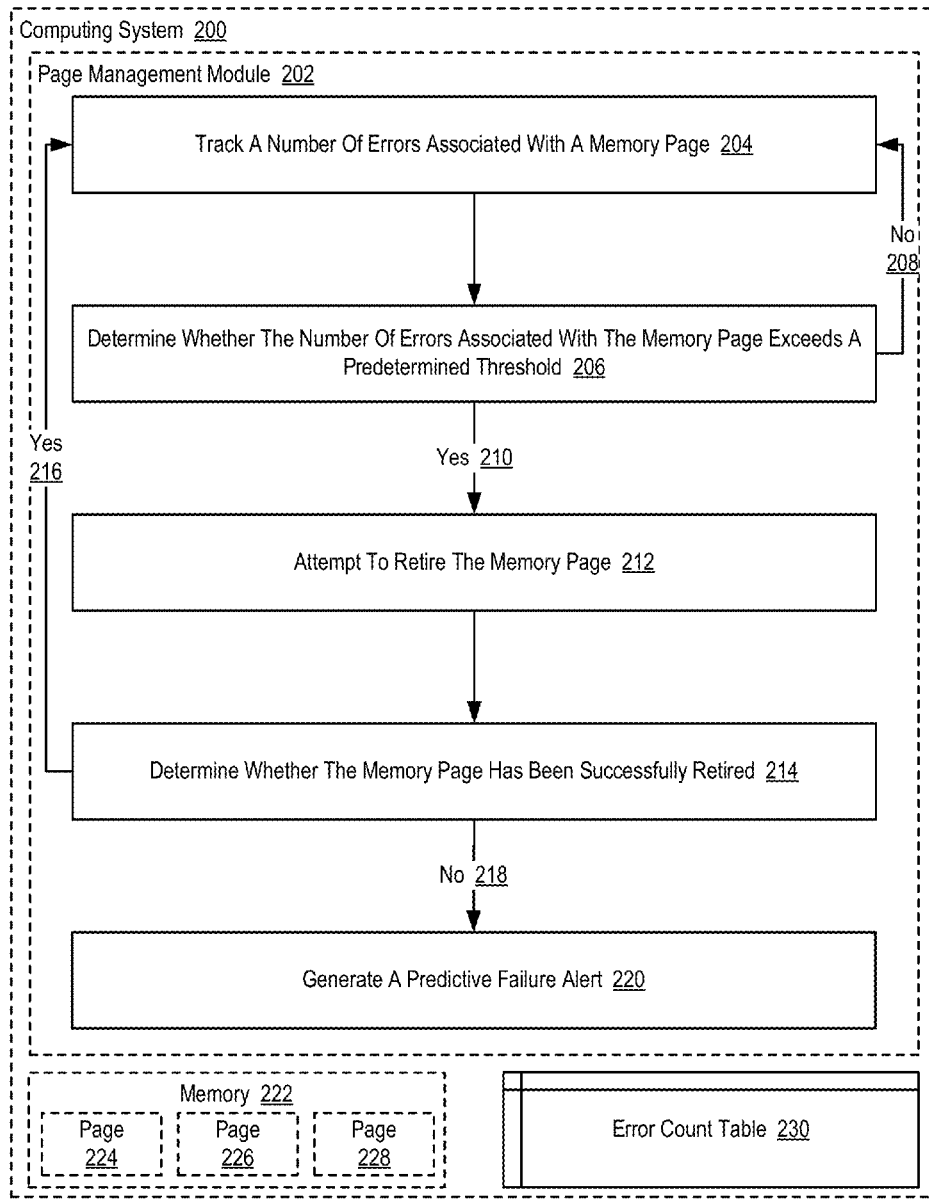
FIG. 2 sets forth a flow chart illustrating an example method for managing faulty memory pages in a computing system according to embodiments of the present invention.

For further explanation, FIG. 2 sets forth a flow chart illustrating an example method for managing faulty memory pages in a computing system (200) according to embodiments of the present invention. The computing system of FIG. 2 includes computer memory (222). The computer memory (222) of FIG. 2 may be embodied, for example, as RAM in the form of a dual in-line memory module ('DIMM') that includes a series of dynamic random-access memory integrated circuits. In the example method of FIG. 2, the computer memory (222) is segmented into a plurality of pages (224, 226, 228). Each page (224, 226, 228) represents a fixed-length contiguous block of virtual memory that is supported by the underlying physical memory (222).

The example method of FIG. 2 includes tracking (204), by the page management module (202), a number of errors associated with a memory page (224, 226, 228). In the example method of FIG. 2, tracking (204) the number of errors associated with a memory page (224, 226, 228) may be carried out through the use of an error count table (230) or other data structure. In such an example, the error count table (230) may include entries for one more of the memory pages (224, 226, 228). Each entry in the error count table (230) may also include a counter identifying the number of errors associated with one or more of the memory pages (224, 226, 228). As such, each time an error is received that is associated with a particular memory page (224), the counter associated with the particular memory page (224) may be incremented.

In the example method of FIG. 2, the errors associated with a memory page (224, 226, 228) are generally correctable errors that may be indicative of a problem with a particular memory page (224, 226, 228). In such an example, the number of errors associated with a memory page (224, 226, 228) that are tracked (204) by the page management module (202) may be characterized as long term errors and short term errors. Short term errors may represent errors that have occurred within a predetermined recent period of time (e.g., 10 seconds, 1 minute, 1 day, etc. . . . ) while long term errors may represent errors that have occurred outside of the predetermined recent period of time. As such, the page management module (202) may track (204) both the number of short term errors associated with a memory page (224, 226, 228) and the number of long term errors associated with a memory page (224, 226, 228). In such a way, the page management module (202) may distinguish between errors that have occurred in a recent error burst versus historical patterns of error activity.

The example method of FIG. 2 also includes determining (206), by the page management module (202), whether the number of errors associated with the memory page (224, 226, 228) exceeds a predetermined threshold. For ease of explanation, the remainder of FIG. 2 will be described using memory page (224) as the memory page generating errors. In the example method of FIG. 2, the predetermined threshold can represent a limit as to the amount of errors associated with the memory page (224) that may occur without requiring intervention from the page management module (202), a system administrator, or other administrative entity. The predetermined threshold described above may include multiple thresholds such as a short term error threshold and a long term error threshold, each of which is set by a system administrator, manufacturer of the memory modules supporting the memory page (224), or other administrative entity.

The example method of FIG. 2 also includes attempting (212), by the page management module (202), to retire the memory page (224). In the example method of FIG. 2, retiring a memory page (224) is a technique that allows a memory page (224) suffering from correctable errors to be removed from use in the virtual memory system—without interrupting user applications. In such an example, however, retiring a memory page (224) requires an operating system or hypervisor that supports page retirement. In the example method of FIG. 2, attempting (212) to retire the memory page is carried out in response to affirmatively (210) determining that the number of errors associated with the memory page (224) exceeds the predetermined threshold.

The example method of FIG. 2 also includes determining (214), by the page management module (202), whether the memory page (224) has been successfully retired. Determining (214) whether the memory page (224) has been successfully retired may be carried out, for example, by setting a timer representing a sufficient amount of time for retiring a memory page (224). After the timer has expired, the page management module (202) may subsequently monitor error codes generated by the memory system to determine whether errors continue to be generated for the memory page (224) that was retired. In such an example, when errors continue to be generated for the memory page (224) that was retired, the page management module (202) may assume that the memory page (224) was not successfully retired in view of the fact that a retired memory page (224) will not be accessed and therefore will not cause errors to be generated. In the example method of FIG. 2, when it is affirmatively (216) determined that the memory page (224) has been successfully retired, the method depicted in FIG. 2 will return to step 204.

The example method of FIG. 2 also includes generating (220), by the page management module (202), a predictive failure alert. A predictive failure alert represents an alert sent to a system administrator or other administrative entity indicating that the memory page (224) that has generated a number of errors that exceeds a predetermined threshold is in need of servicing. In the example method of FIG. 2, generating (220) a predictive failure alert is carried out in response to determining that the memory page has not (218) been successfully retired. In such an example, the memory page may not (218) have been successfully retired because the operating system or hypervisor does not support page retirement.

Figure 3:
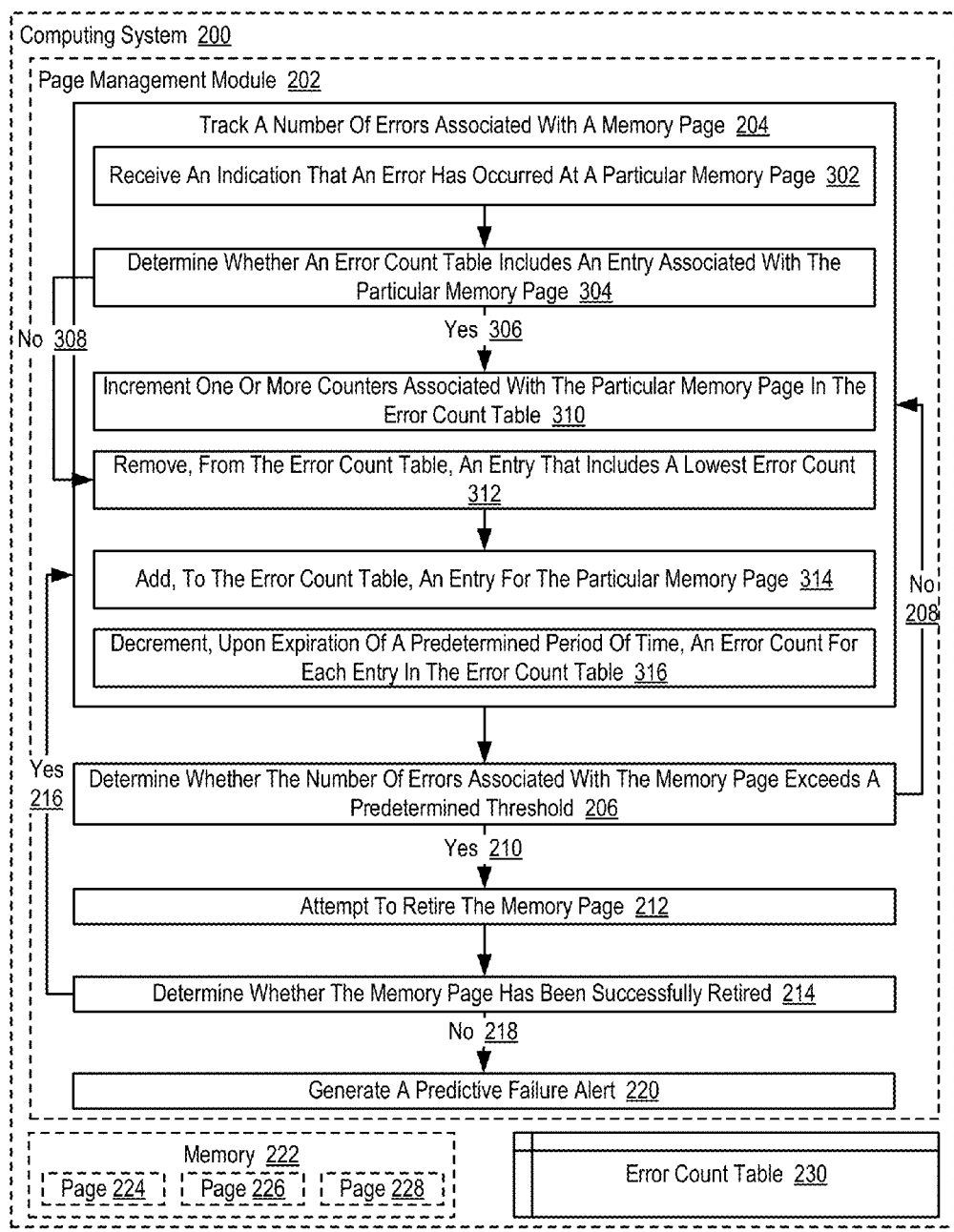
FIG. 3 sets forth a flow chart illustrating an additional example method for managing faulty memory pages in a computing system according to embodiments of the present invention.

For further explanation, FIG. 3 sets forth a flow chart illustrating an additional example method for managing faulty memory pages in a computing system (200) according to embodiments of the present invention. The example method of FIG. 3 is similar to the example method of FIG. 2 as it also includes tracking (204) a number of errors associated with a memory page (224, 226, 228), determining (206) whether the number of errors associated with the memory page (224, 226, 228) exceeds a predetermined threshold, attempting (212) to retire the memory page, determining (214) whether the memory page has been successfully retired, and generating (220) a predictive failure alert.

In the example method of FIG. 3, tracking (204) a number of errors associated with a memory page (224, 226, 228) can include receiving (302), by the page management module (202), an indication that an error has occurred at a particular memory page (224). Receiving (302) an indication that an error has occurred at a particular memory page (224) may be carried out, for example, by the page management module (202) listening for errors on a memory bus, by the page management module (202) being notified of an error by an operating system, by the page management module (202) being notified of an error by a memory controller, and so on. In such a way, page management module (202) may learn that an error has occurred at a specifically identified page in virtual memory. In the example method of FIG. 3, receiving (302) an indication that an error has occurred at a particular memory page (224) may therefore include receiving a page number identifying the particular memory page (224), receiving an identification of a particular rank in a memory module that the particular memory page (224) corresponds to, and so on.

In the example method of FIG. 3, tracking (204) a number of errors associated with a memory page (224, 226, 228) can also include determining (304), by the page management module (202), whether an error count table (230) includes an entry associated with the particular memory page (224). Consider an example in which the error count table (230) is embodied as follows:

TABLE 1

Error Count Table

| Page Number | Short Term Errors | Long Term Errors | Rank |
|---|---|---|---|
| 1 | 12 | 122 | 0 |
| 2 | 10 | 105 | 0 |
| 3 | 9 | 93 | 0 |
| 4 | 8 | 66 | 0 |
| 5 | 5 | 63 | 0 |
| 6 | 3 | 20 | 0 |
| 7 | 1 | 2 | 0 |

The table depicted above includes four columns: 1) a 'Page Number' column that identifies a particular memory page, 2) a 'Short Term Errors' column that identifies the number of short term errors associated with a particular memory page, 3) a long Term Errors' column that identifies the number of long term errors associated with a particular memory page, and 4) a 'Rank' column that identifies the rank on a memory module that supports the particular memory page. In the example method of FIG. 3, determining (304) whether an error count table (230) includes an entry associated with the particular memory page (224) may be carried out by determining the identifier, such as a page number and rank number, for the particular memory page (224) and searching the error count table (230) for a matching entry.

In the example method of FIG. 3, tracking (204) a number of errors associated with a memory page (224, 226, 228) can also include incrementing (310) one or more counters associated with the particular memory page (224) in the error count table (230). In the example method of FIG. 3, incrementing (310) one or more counters associated with the particular memory page (224) in the error count table (230) may be carried out in response to affirmatively (306) determining that the error count table (230) includes an entry associated with the particular memory page (224). In the example method of FIG. 3, the page management module (202) may increment a short term counter or the long term counter, as appropriate, for each error generated by the particular memory page (224) in order to keep a running count indicate the extent to which a particular memory page (224) is error prone.

In the example method of FIG. 3, tracking (204) a number of errors associated with a memory page (224, 226, 228) can also include removing (312), from the error count table (230), an entry that includes a lowest error count. In the example method of FIG. 3, removing (312) an entry that includes a lowest error count from the error count table (230) is carried out in response to determining that the error count table (230) does not (308) include an entry associated with the particular memory page (224). In the example method of FIG. 3, when an error is generated by a particular memory page (224) for which there is no entry in the error count table (230), the entry in the error count table (230) that includes the lowest error count of any entry in the error count table (230) may be removed from the error count table (230). In such a way, memory pages that do not generate many errors will not be tracked by the error count table (230) and memory pages that generate a relatively large number of errors will be tracked in the error count table (230). As such, the size of the error count table (230) may be reduced to a manageable size without losing the ability to track the behavior of memory pages that generate a relatively large number of errors.

In the example method of FIG. 3, tracking (204) a number of errors associated with a memory page (224, 226, 228) can also include adding (314), to the error count table (230), an entry for the particular memory page (224). In the example method of FIG. 3, adding (314) an entry for the particular memory page (224) to the error count table (230) is carried out in further response to determining that the error count table (230) does not (308) include an entry associated with the particular memory page (224). In such a way, each error that is received will be tracked, at least briefly, in the error count table (230).

In the example method of FIG. 3, tracking (204) a number of errors associated with a memory page (224, 226, 228) can also include decrementing (316), upon expiration of a predetermined period of time, an error count for each entry in the error count table (230). In the example method of FIG. 3, decrementing (316) an error count for each entry in the error count table (230) upon expiration of a predetermined period of time may be done so as to eventually remove entries for memory pages that previously generated large amounts of errors but currently generate significantly fewer errors.

Consider the example error count table (230) included above where memory page '1' has 12 short term errors and 122 long term errors associated with the memory page. In such an example, without decrementing (316) an error count for each entry in the error count table (230) upon expiration of a predetermined period of time, the entry for memory page '1' may remain in the error count table (230) indefinitely as only the entries with the lowest error count will be removed (312) from the error count table (230). By decrementing (316) an error count for each entry in the error count table (230) upon expiration of a predetermined period of time, the entry for memory page '1' will eventually be removed (312) from the error count table (230) so long as new errors are being generated infrequently for the memory page as the error count for memory page '1' will eventually trend towards zero. In the example method of FIG. 3, the predetermined period of time may be set by a system administrator or other administrative entity. Furthermore, a predetermined period of time for short term errors may be different than a predetermined period of time for long term errors.

Figure 4:
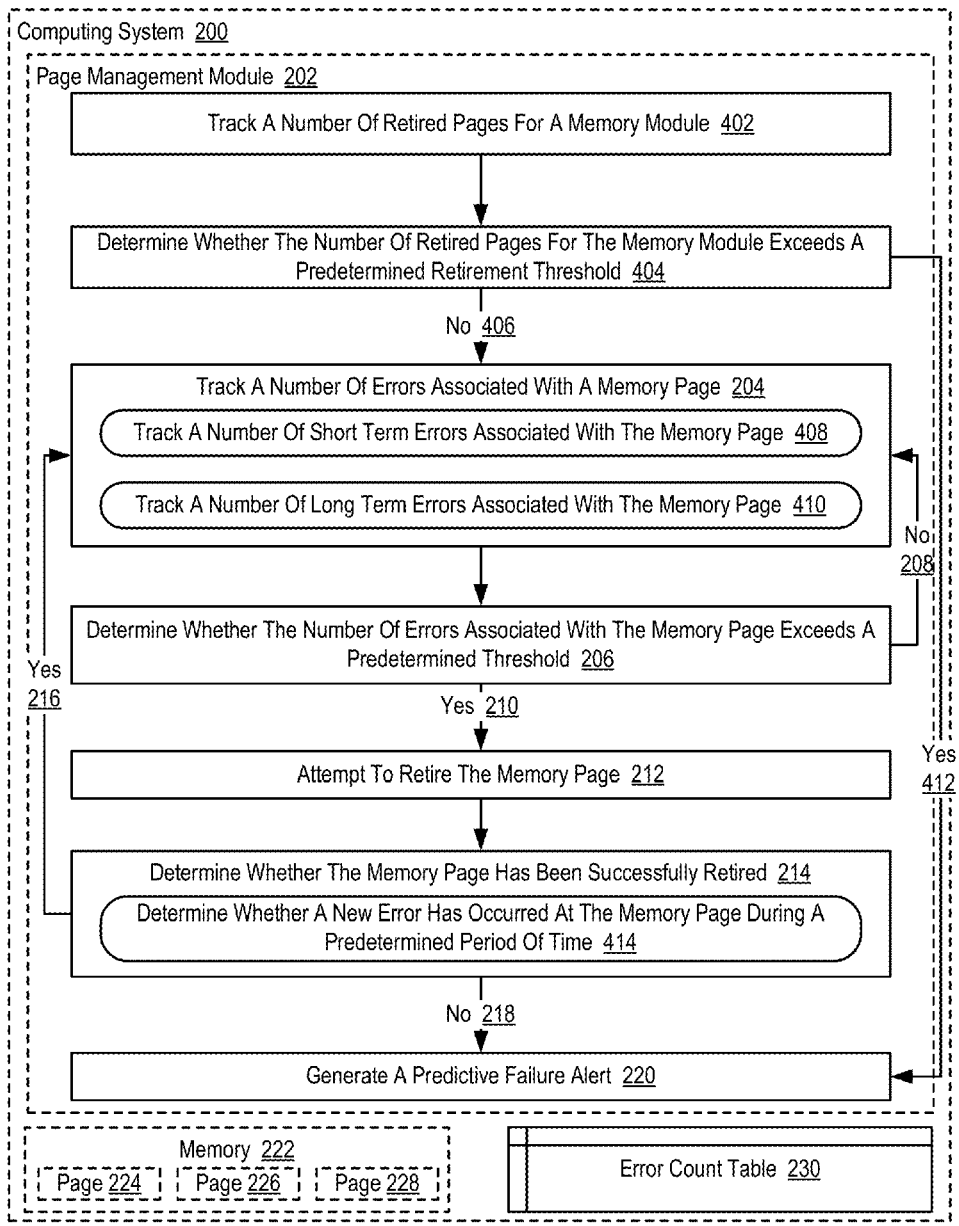
FIG. 4 sets forth a flow chart illustrating an additional example method for managing faulty memory pages in a computing system according to embodiments of the present invention.

For further explanation, FIG. 4 sets forth a flow chart illustrating an additional example method for managing faulty memory pages in a computing system (200) according to embodiments of the present invention. The example method of FIG. 4 is similar to the example method of FIG. 2 as it also includes tracking (204) a number of errors associated with a memory page (224, 226, 228), determining (206) whether the number of errors associated with the memory page (224, 226, 228) exceeds a predetermined threshold, attempting (212) to retire the memory page, determining (214) whether the memory page has been successfully retired, and generating (220) a predictive failure alert.

In the example method of FIG. 4, determining (214) whether the memory page has been successfully retired can include determining (414) whether a new error has occurred at the memory page (224) during a predetermined period of time. Determining (414) whether a new error has occurred at the memory page (224) during a predetermined period of time may be carried out, for example, by setting a timer representing a sufficient amount of time for retiring a memory page (224). After the timer has expired, the page management module (202) may subsequently monitor error codes generated by the memory system to determine whether errors continue to be generated for the memory page (224) that was retired. In such an example, when errors continue to be generated for the memory page (224) that was retired, the page management module (202) may assume that the memory page (224) was not successfully retired in view of the fact that a retired memory page (224) will not be accessed and therefore will not cause errors to be generated.

In the example method of FIG. 4, tracking (204) a number of errors associated with a memory page (224, 226, 228) can include tracking (408) a number of short term errors associated with the memory page (224). In the example method of FIG. 4, tracking (204) a number of errors associated with a memory page (224, 226, 228) can also include tracking (410) a number of long term errors associated with the memory page (224). Short term errors may represent errors that have occurred within a predetermined recent period of time (e.g., 10 seconds, 1 minute, 1 day, etc. . . . ) while long term errors may represent errors that have occurred outside of the predetermined recent period of time. As such, the page management module (202) may track (408) a number of short term errors associated with the memory page (224) and also track (410) a number of long term errors associated with the memory page (224). In such a way, the page management module (202) may distinguish between errors that have occurred in a recent error burst versus historical patterns of error activity.

The example method of FIG. 4 also includes tracking (402), by the page management module (202), a number of retired pages for a memory module. In the example method of FIG. 4, tracking (402) a number of retired pages for a memory module may be carried out, for example, by the page management module (202) maintaining a counter identifying the number of times the page management module (202) has attempted (212) to retire memory pages in particular memory module. In such a way, the page management module (202) may track the amount of errors generated by a particular memory module to identify memory modules in need of replacement.

The example method of FIG. 4 also includes determining (404), by the page management module (202), whether the number of retired pages for the memory module exceeds a predetermined retirement threshold. In the example method of FIG. 4, determining (404) whether the number of retired pages for the memory module exceeds a predetermined retirement threshold may be carried out by comparing the number of retired pages for the memory module to a predetermined retirement threshold that is set, for example, by a system administrator or other administrative entity. The predetermined retirement threshold can represent a limit as to the amount of pages within a particular memory module that may be retired without requiring intervention from the page management module (202), a system administrator, or other administrative entity.

In the example method of FIG. 4, generating (220) a predictive failure alert may be carried out in response to affirmatively (412) determining that the number of retired pages for the memory module exceeds the predetermined retirement threshold. If the number of retired pages for the memory module does not (406) exceed the predetermined retirement threshold, however, control of the method depicted in FIG. 4 returns to step 204.

Although the example method of FIG. 4 is discussed in terms of tracking (402) a number of retired pages for a particular memory module, readers will appreciate that the page management module (202) may track the number of retired pages for a particular rank within a memory module. In such a way, the number of retired pages within a particular rank may be tracked and compared to a predetermined threshold representing the maximum percentage of pages within a rank that may be retired. Once the percentage of retired pages within a rank exceeds the predetermined threshold, a predictive failure alert may be generated.

Readers will appreciate that the methods and apparatus described above can be useful in determining whether a page retire feature is supported in a computing system, as attempting to retire a particular page will cause the particular page to cease generating errors over time. Furthermore, the methods and apparatus described above can be useful in determining when problems are localized as repeated errors in the same rank can serve as an indication that there is a localized error that is specific to the rank generating repeated errors. In addition, the methods and apparatus described above can be ensure that pages with errors counts that are not increasing rapidly are not tracked for errors, while pages that are generating large amounts of errors are tracked, such that limited memory resources for tracking errors can be utilized to track the activity of the most error prone pages. By decreasing errors counts for a particular page over time, the methods and apparatus described above can create a benefit over previous systems that would continue taking old errors into account when determining whether to generate a predictive failure alert, even when the page had ceased generating errors at a rapid pace.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having computer program instructions that, when executed by the computer processor, cause the apparatus to carry out the steps of:

tracking a number of errors associated with a memory page, wherein tracking the number errors associated with the memory page comprises:
  receiving an indication that an error has occurred at a particular memory page;
  determining whether an error count table includes an entry associated with the particular memory page;
  responsive to determining that the error count table does not include the entry associated with the particular memory page:
    removing, from the error count table, an existing entry that includes a lowest error count; and
    adding, to the error count table, a new entry for the particular memory page;
determining whether the number of errors associated with the memory page exceeds a predetermined threshold;
responsive to determining that the number of errors associated with the memory page exceeds the predetermined threshold, attempting to retire the memory page;
determining that the memory page has not been successfully retired because page retirement is not supported by an operating system or a hypervisor; and
responsive to determining that the memory page has not been successfully retired because page retirement is not supported by the operating system or the hypervisor, generating a predictive failure alert;
wherein determining whether the memory page has been successfully retired further comprises determining whether a new error has occurred at the memory page during a predetermined period of time.

2. The apparatus of claim 1 wherein tracking the number errors associated with the memory page further comprises:
responsive to determining that the error count table includes an entry associated with the particular memory page, incrementing one or more counters associated with the particular memory page in the error count table.

3. The apparatus of claim 1 wherein tracking the number of errors associated with the memory page further comprises decrementing, upon expiration of a predetermined period of time, an error count for each entry in the error count table.

4. The apparatus of claim 1 wherein tracking a number of errors associated with a memory page includes:
tracking a number of short term errors associated with the memory page; and
tracking a number of long term errors associated with the memory page.

5. The apparatus of claim 1 further comprising computer program instructions that, when executed by the computer processor, cause the apparatus to carry out the steps of:
tracking a number of retired pages for a memory module;
determining whether the number of retired pages for the memory module exceeds a predetermined retirement threshold; and
responsive to determining that the number of retired pages for the memory module exceeds the predetermined retirement threshold, generating a predictive failure alert.

6. A computer program product for managing faulty memory pages in a computing system, the computer program product disposed upon a computer readable storage medium, wherein the computer readable storage medium is a non-transitory medium, the computer program product comprising computer program instructions that, when executed, cause a computer to carry out the steps of:
tracking a number of errors associated with a memory page, wherein tracking the number errors associated with the memory page comprises:

receiving an indication that an error has occurred at a particular memory page;
determining whether an error count table includes an entry associated with the particular memory page;
responsive to determining that the error count table does not include the entry associated with the particular memory page:
  removing, from the error count table, an existing entry that includes a lowest error count; and
  adding, to the error count table, a new entry for the particular memory page;
determining whether the number of errors associated with the memory page exceeds a predetermined threshold;
responsive to determining that the number of errors associated with the memory page exceeds the predetermined threshold, attempting to retire the memory page;
determining that the memory page has not been successfully retired because page retirement is not supported by an operating system or a hypervisor; and
responsive to determining that the memory page has not been successfully retired because page retirement is not supported by the operating system or the hypervisor, generating a predictive failure alert;
wherein determining whether the memory page has been successfully retired further comprises determining whether a new error has occurred at the memory page during a predetermined period of time.

7. The computer program product of claim 6 wherein tracking the number errors associated with the memory page further comprises:
  responsive to determining that the error count table includes an entry associated with the particular memory page, incrementing one or more counters associated with the particular memory page in the error count table.

8. The computer program product of claim 6 wherein tracking the number of errors associated with the memory page further comprises decrementing, upon expiration of a predetermined period of time, an error count for each entry in the error count table.

9. The computer program product of claim 6 wherein tracking a number of errors associated with a memory page includes:
  tracking a number of short term errors associated with the memory page; and
  tracking a number of long term errors associated with the memory page.

10. The computer program product of claim 6 further comprising computer program instructions that, when executed by the computer processor, cause the computer to carry out the steps of:
  tracking a number of retired pages for a memory module;
  determining whether the number of retired pages for the memory module exceeds a predetermined retirement threshold; and
  responsive to determining that the number of retired pages for the memory module exceeds the predetermined retirement threshold, generating a predictive failure alert.

11. A method comprising:
by computer program instructions on a computing device, tracking a number of errors associated with a memory page, wherein tracking the number errors associated with the memory page comprises:
  receiving an indication that an error has occurred at a particular memory page;
  determining whether an error count table includes an entry associated with the particular memory page;
  responsive to determining that the error count table does not include the entry associated with the particular memory page:
    removing, from the error count table, an existing entry that includes a lowest error count; and
    adding, to the error count table, a new entry for the particular memory page;
  determining whether the number of errors associated with the memory page exceeds a predetermined threshold;
  responsive to determining that the number of errors associated with the memory page exceeds the predetermined threshold, attempting to retire the memory page;
  determining that the memory page has not been successfully retired because page retirement is not supported by an operating system or a hypervisor; and
  responsive to determining that the memory page has not been successfully retired because page retirement is not supported by the operating system or the hypervisor, generating a predictive failure alert;
  wherein determining whether the memory page has been successfully retired further comprises determining whether a new error has occurred at the memory page during a predetermined period of time.

12. The method of claim 11 wherein tracking the number errors associated with the memory page further comprises:
  responsive to determining that the error count table includes an entry associated with the particular memory page, incrementing one or more counters associated with the particular memory page in the error count table.

13. The method of claim 11 wherein tracking the number of errors associated with the memory page further comprises decrementing, upon expiration of a predetermined period of time, an error count for each entry in the error count table.

14. The method of claim 11 wherein tracking a number of errors associated with a memory page includes:
  tracking a number of short term errors associated with the memory page; and
  tracking a number of long term errors associated with the memory page.

15. The method of claim 11 further comprising:
  tracking a number of retired pages for a memory module;
  determining whether the number of retired pages for the memory module exceeds a predetermined retirement threshold; and
  responsive to determining that the number of retired pages for the memory module exceeds the predetermined retirement threshold, generating a predictive failure alert.

* * * * *